United States Patent [19]

Karsh et al.

[11] 4,411,397
[45] Oct. 25, 1983

[54] BIDIRECTIONAL TAPE DRIVE SYSTEMS

[75] Inventors: Herbert Karsh, Laguna Beach; Irving Karsh, Costa Mesa, both of Calif.

[73] Assignee: Bell & Howell Company, Chicago, Ill.

[21] Appl. No.: 925,673

[22] Filed: Jul. 18, 1978

[51] Int. Cl.³ ............................................... G03B 1/04
[52] U.S. Cl. ....................................... 242/192; 226/1;
226/188; 226/195; 242/201; 464/61; 464/160;
474/1; 474/87
[58] Field of Search ............................ 226/1, 188, 195;
242/192, 207, 201, 210, 206, 209, 67.4, 67.5;
64/10, 15 C, 20, 27 C, 27 CT, 27 R, 11 F, 28 R,
DIG. 2, 29

[56] References Cited

U.S. PATENT DOCUMENTS

| | | | |
|---|---|---|---|
| 3,528,625 | 9/1970 | Bumb, Jr. | 242/192 |
| 3,583,618 | 6/1971 | Lewis | 226/195 |
| 3,667,701 | 6/1972 | Blum | 242/192 |

OTHER PUBLICATIONS

Orlado A. et al., Dual–Capstan Tape Transport, I.B.M. Technical Disclosure Bulletin, vol. 14, No. 7, Dec. 1971, pp. 2137-2138.

Karsh I. A New Power Conserving Tape Drive, International Telemetering Conference Oct. 1973, pp. 80-85.

Primary Examiner—Stanley N. Gilreath
Attorney, Agent, or Firm—Benoit Law Corporation

[57] ABSTRACT

Bidirectional tape drive systems have first and second tape drive capstans and first and second tape drives for rotating, respectively, the first and second tape drive capstans. The first capstan is angularly movable relative to the first capstan drive and a first elastic coupling restrains relative angular movement between the first capstan and the first capstan drive. Similarly, the second capstan is angularly movable relative to the second capstan drive and a second elastic coupling restrains relative angular movement between the second capstan and the second capstan drive. In this manner, tape tension is maintained above zero when the bidirectional tape drive changes directions, and excessive tension upon application of the tape assembly to the tape drive is avoided, while tape slack upon removal of the tape assembly from the tape drive is automatically taken up.

12 Claims, 3 Drawing Figures

BIDIRECTIONAL TAPE DRIVE SYSTEMS

BACKGROUND OF THE INVENTION

2. Field of the Invention

The subject invention relates to systems for driving tapes and other elongate flexible web-like members and, more specifically, relates to bidirectional tape drives. By way of example, the invention has utility in the magnetic tape recording art.

2. Prior-Art Statement

Dual capstan bidirectional tape drive systems are well known, as is the fact that the leading capstan in such systems is driven at a higher speed than the trailing capstan, regardless of the direction of movement of the tape, so that the ideal of appropriate tape tension between the two capstans is approached as closely as possible. Prior-art approaches to these desiderata have included the use of such equipment as multiple-motor systems, slip clutch arrangements, and spring-biased reel systems.

An advanced dual capstan drive system has been disclosed in U.S. Pat. No. 3,583,618 by Richard A. Lewis. In that system the two capstans are connected, respectively, to first and second drums and are bidirectionally driven via first and second resilient belts which engage both drums and which, respectively, are advanced by first and second pulleys of different diameter. The theoretical background of that system, as well as some practical embodiments thereof, have been described by one of the subject inventors in an article entitlted ASTRODRIVE-A NEW POWER-CONSERVING TAPE DRIVE (Proceedings 1973, International Telemetering Conference).

As that article points out, a basic disadvantage of differential drive-belt systems is a momentary loss of tape tension during tape direction reversals resulting from the inherent elasticity of the drive belts. This in particular limits the use of that system in applications where rapid and frequent shuttling between the forward and reverse mode is required. In an effort to overcome this limitation, it has been proposed that each of the capstan be directly coupled to a separate servo-controlled direct-current motor, and that the relative velocity differential be maintained electronically, rather than mechanically. This, of course, would undo most of the simplicity inherent in the underlying dual resilient belt drive system.

Other disadvantages of the type of tape drive under consideration include a very limited ability to take up slack upon removal of the tape system from the drive, and to limit tension upon insertion of the tape assembly.

A less advanced system of the above mentioned type using individual capstan drives is apparent from U.S. Pat. No. 3,528,625 by Frank C. Bumb.

Other references noted in a novelty search but not considered particularly relevant are U.S. Pat. Nos. 2,873,073, 2,927,743, 3,038,678, 3,050,225 and 3,482,840.

SUMMARY OF THE INVENTION

It is broadly an object of this invention to overcome the above mentioned disadvantages. It is a germane object of this invention to provide improved bidirectional tape drive systems.

It is a related object of this invention to provide improved magnetic tape recording apparatus and methods.

It is a more specific object of this invention to increase the tolerance of bidirectional tape drive systems to disturbances caused by low-tension portions of the tape.

It is also an object of this invention to avoid momentary loss of tape tension during tape direction reversals in bidirectional tape drive systems.

It is a further object of this invention to provide for an automatic takeup of slack upon removal of the tape assembly from the tape drive or transport and for an avoidance of excessive tension upon insertion of the tape assembly into the tape drive or transport.

Further objects of this invention are discussed or will become apparent in the further course of this disclosure.

From a first aspect thereof, the subject invention resides in a bidirectional tape drive, and more specifically, in the improvement comprising, in combination, first tape drive means including a first tape drive capstan, first capstan drive means for rotating the first capstan, means for mounting the first capstan for angular movement relative to the first capstan drive means, and first elastic coupling means connected to the first capstan and to the first capstan drive means for elastically restraining relative angular movement between the first capstan and the first capstan drive means, and second tape drive means including a second tape drive capstan, second capstan drive means for rotating the second capstan, means for mounting the second capstan for angular movement relative to the second capstan drive means, and second elastic coupling means connected to the second capstan and to the second capstan drive means for elastically restraining relative angular movement between the second capstan and the second capstan drive means, said first and second elastic coupling means acting in opposite angular directions in their restraining functions.

From another aspect thereof, the subject invention resides in a method of driving a tape in either of two directions with the aid of a first tape drive capstan, first capstan drive means for rotating the first capstan, a second tape drive capstan, and second capstan drive means for rotating the second capstan. The invention according to this aspect resides, more specifically, in the improvement comprising in combination the steps of rendering the first capstan angularly movable relative to the first capstan drive means, rendering the second capstan angularly movable relative to the second capstan drive means, elastically restraining angular movement of the first capstan relative to the first capstan drive means in a first angular direction, and elastically restraining angular movement of the second capstan relative to the second capstan drive means in a second angular direction opposite to said first angular direction.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts and in which.

DESCRIPTION OF PREFERRED EMBODIMENTS

Figure 1:
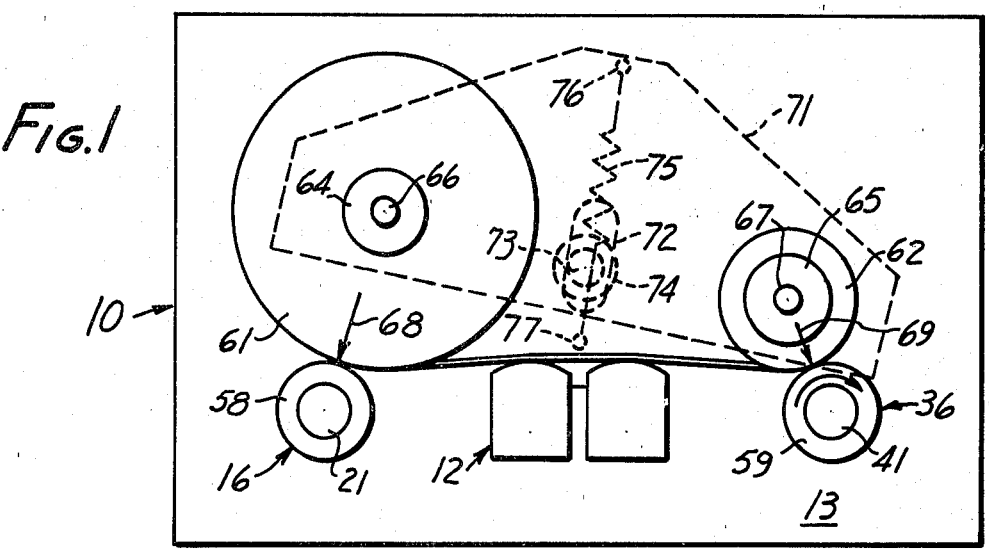
FIG. 1 is a top view of a bidirectional tape drive in accordance with a preferred embodiment of the subject invention.
Figure 2:
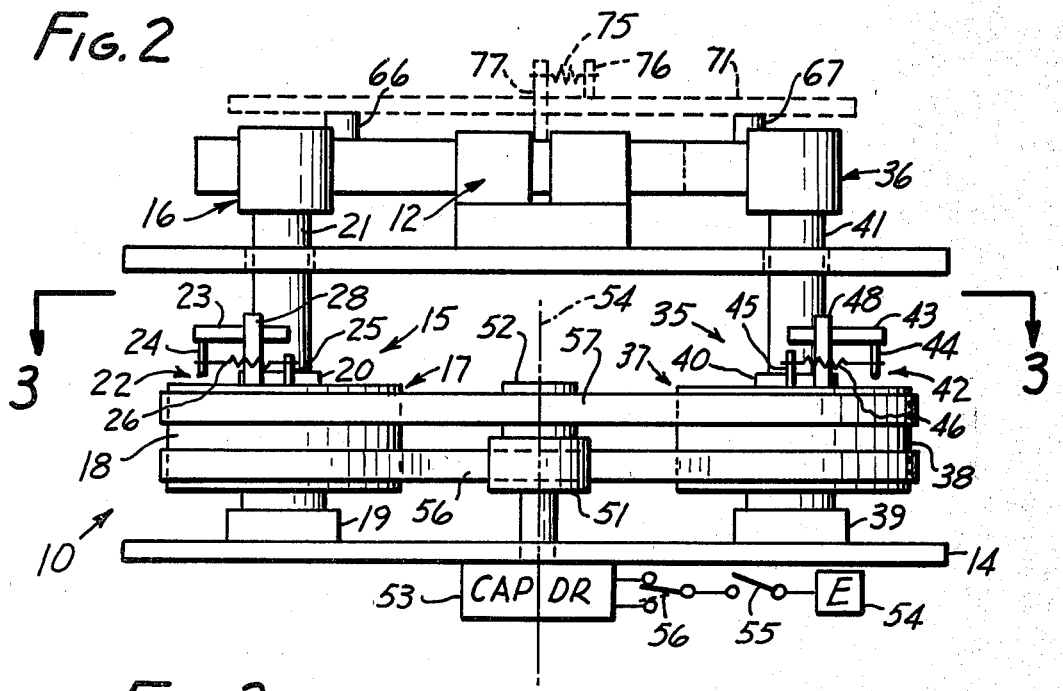
FIG. 2 is a side view of the apparatus of FIG. 1.
Figure 3:
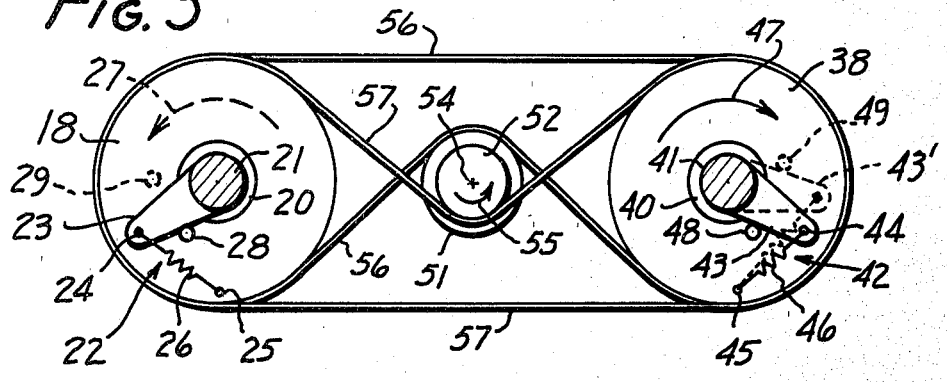
FIG. 3 is a section taken along the line 3—3 of FIG. 2.

The bidirectional tape drive 10 of the illustrated preferred embodiment of the subject invention shown in FIGS. 1 to 3 may be employed as a tape transport in magnetic tapes recording and playback apparatus. Accordingly, there is shown a pair of conventional magnetic tape recording, playback and erasing heads 12 mounted on a base plate 13 and symbolizing not only the requisite heads, but also the remainder of the electrical and electronic equipment required in a given tape recording and playback apparatus.

The tape drive or tape transport 10 also includes a second base plate 14 which may be connected to the first base plate 13 by suitable braces or brackets (not shown).

Mounted on the second base plate 14 are first tape drive means 15 including a first tape drive capstan 16 and first capstan drive means 17 for rotating the first capstan.

In the illustrated preferred embodiment, the first capstan drive means 17 include a first pulley 18 which is mounted by a bearing 19 on the lower base plate 14 for rotation about an axis being also the axis of rotation of the capstan 16. The pulley 18 carries an axially disposed bearing 20 for mounting the first capstan 16 for angular movement relative to the first capstan drive means 17 or first pulley 18. In practice, the bearing 20 may be a partially hollow shaft of the pulley 18 which, in turn, is rotatably mounted in the bearing 19 and which receives a lower portion of a shaft 21 of the first capstan 16 for angular movement or limited rotation relative to the pulley 18.

The first tape drive means 15 also include first elastic coupling means 22 connected to the first capstan 16 and to the first capstan drive means 17 or pulley 18 for elastically restraining relative angular movement between the first capstan and the first capstan drive means or pulley.

In the illustrated preferred embodiment, the capstan shaft 21 is equipped with an arm 23 which carries a pin 24. The pulley 18 carries a corresponding pin 25. A resilient member or spring 26 is connected to and extends between the pins 24 and 25, thereby biasing angular movement of the first capstan 16 in a first sense of rotation 27 indicated in FIG. 3. The resilient member or spring 26 thus has an end connected to the first capstan 16 and another end connected to the first tape drive means 15.

The first tape drive means 15 also include means connected to at least one of the first capstan 16 and first capstan drive means 17 for stopping angular movement of the first capstan relative to the first capstan drive means in the mentioned first sense of rotation 27. In the illustrated preferred embodiment, these stopping means include a pin 28 carried by the pulley 18 and engaged by the arm 23 under the bias of the spring 26.

In the bidirectional tape drive 10 according to the illustrated preferred embodiment of the subject invention, the parts or means 15 to 28 are duplicated as parts 35 to 48, as seen in FIGS. 1 to 3.

Accordingly, the tape drive 10 includes second tape drive means 35 having a second tape drive capstan 36 and second capstan drive means 37 for rotating the second capstan. These second capstan drive means 37 include a pulley 38 which is rotatably mounted by a bearing 39.

A bearing 40 mounts the second capstan 36 via a shaft 41 for angular movement relative to the second capstan drive means 37 or pulley 38. Second elastic coupling means 42 are connected to the second capstan 36 and to the second capstan drive means 37 or pulley 38 for elastically restraining relative angular movement between the second capstan and second capstan drive means or pulley.

In particular, an arm 43 is attached to the shaft 41 of the second capstan 36 and carries a pin 44. A corresponding pin 45 is carried by the pulley 38 and a second resilient member or spring 46 is connected to and extends between pins 44 and 45 to bias the second capstan 36 angularly in a second sense of rotation 47 toward the stop means 48. In particular, the spring 46 biases the arm 43 into engagement with a pin 48 carried by the pulley 38 and functioning as a stop. As seen in FIGS. 2 and 3, the second resilient member or spring 46 thus has an end connected to the second capstan 36 and another end connected to the second tape drive means 35.

The further nature and function of the parts or means 35 to 48 may be readily understood from a consideration of the function of the parts or means 15 to 28 described above; the difference being, however, that the sense of rotation 47 is clockwise as seen in FIG. 3, while the sense of rotation 27 is counter-clockwise.

In particular, the first and second elastic coupling means 22 and 42 act in opposite directions in their restraining function. Angular movement of the first capstan 16 relative to the first capstan drive means 15 is thus elastically restrained in a first angular direction, and angular movement of the second capstan 36 relative to the second capstan drive means 35 is elastically restrained in a second angular direction opposite to said first angular direction.

The first tape drive means 15 or, in effect, the first and second tape drive means, include a third pulley 51 and a fourth pulley 52 having a smaller diameter than the third pulley. A capstan drive motor 53 is connected to the third and fourth pulleys for driving these pulleys about a common axis of rotation 54 in a first sense of rotation and selectively or alternatively in an opposite second sense of rotation 55.

A first elastic belt 56 extends partially about the first and second pulleys 18 and 38 and also partially about the third pulley 51 to one side of the common axis 54. Similarly, a second elastic belt 57 extends partially about the first and second pulleys 18 and 38 and also extends partially about the fourth pulley 52 to a side of the common axis 45 opposite to the one side just mentioned.

The motor 53 typically is a bidirectional electric motor which is energized from a source of electric current 54 via an on-off switch 55 and a direction of rotation reversal switch 56. In practice, the switch 56 may be a polarity reversal switch and the motor 53 may be of a permanent-magnet field type that reverses its sense of rotation when the polarity of the applied electric drive current is reversed.

Each of the capstans 16 and 36 has an elastic tire 58 and 59 extending circumferentially about an upper end of its rigid shaft 21 and 41, respectively. The capstan tires 58 and 59 are in firm contact with flangeless tape packs or coils 61 and 62, respectively.

In accordance with conventional practice, the coils 61 and 62 of magnetic recording tape 63 are wound on hubs 64 and 65 sitting on shafts 66 and 67, respectively.

In principle, the rotatable shafts 66 and 67 could be stationary and the capstans 16 and 36 could then be movable towards and into intimate contact with the packs 61 and 62. It is generally, however, more practical to mount the shafts 66 and 67 movable toward stationarily mounted, rotatable capstans 16 and 36. In accordance with conventional practice, and as indicated in FIG. 1 by arrows 68 and 69, the tape coils 61 and 62 are then pressed via movable shafts 66 and 67 into firm peripheral engagement with the capstan tires 58 and 59.

The practice of the subject invention lends itself to cartridge-load or reel-to-reel transport arrangements. This, as such, is conventional as may be seen from the above mentioned Bumb U.S. Pat. No. 3,528,625, Lewis U.S. Pat. No. 3,583,618 and ASTRODRIVE article.

By way of example, FIGS. 1 and 2 show in dotted outline a tape pack mounting plate 71 carrying the tape hub shafts 66 and 67 and having an elongate slot along a central axis of symmetry. A pivot pin 73 extends from the base plate 13 into the slot 71 and has a shoulder 74 for releasably retaining the tape pack mounting plate 71 spaced from the base plate 13.

A tension spring 75 engages and extends between a pin 76 attached to the top mounting plate 71 and a pin 77 rising from the base plate 13. During operation, the tension spring will operate on the tape top shafts 66 and 77 so as to maintain both tape packs 61 and 62 in firm contact with the capstan tires 58 and 59.

The parts 71 to 77 shown in dotted outline in FIGS. 1 and 2 are symbolic of the prior-art tape top cartridge shown in the above mentioned ASTRODRIVE article which is herewith incorporated by reference herein. As mentioned in that article, there may be a tension spring below the tape packs which is in addition to the top tension spring 75, and rubber stops may be provided to limit the travel of the tape packs and serve as mechanical brakes when the cartridge is removed from the transport. In addition to the lower tension spring just mentioned, there may also be a lower pack mounting plate (not shown). During operation of the capstan drive motor 53, the belt 56 on the larger diameter pulley 51 attempts to drive the pulleys 18 and 38 at one velocity, while the belt 57 on the smaller diameter pulley 52 tries to drive the pulleys 18 and 38 at a lower velocity. In this manner, the belt 57 applies load torque to the two driven pulleys 13 and 38, while the faster belt 56 applies driving torque.

If the drive motor 53 rotates the pulleys 51 and 52 in the direction of the arrow 55, the pulley 38 is retarded one increment from the fast velocity or increased two increments from the slow velocity provided by the belts 56 and 57, respectively, for a net slow down of one increment (−1) from the fast velocity. Pulley 18 is then retarded two increments, from the fast velocity, and increased only one increment from the flow velocity, for a net decrease of two increments (−2) from the fast velocity. Since the drive system is symmetrical, all increments will be equal in magnitude.

Accordingly, the two driven pulleys 18 and 38 will rotate with a velocity differential equal to one-third of the differential indicated by the two diameters of drive pulleys 51 and 52. If the rotational direction of pulleys 51 and 52 is reversed, the velocity increments will also be reversed, providing for a completely bidirectional drive system. The tape pack hubs 64 and 65 may thus alternate as takeup and supply hubs.

As explained, the capstan which at the time acts as the takeup capstan in association with the takeup pack is driven at a somewhat higher speed than the capstan acting at that time as supply capstan with the supply pack. In this manner, proper tension of the stretch of tape 63 between the capstan 16 and 36 is maintained in the tape path past the transducers 12. The arm 23 or 43 associated with the supply capstan remains seated against the corresponding stop 28 or 48.

On the other hand, the arm 43 or 23 associated with the takeup capstan 36 or 16 will be lifted off the corresponding stop 48 or 28 against the bias of the spring 46 or 26, as shown in FIG. 3 in dotted lines at 43' for the case in which the capstan 36 is the takeup capstan and the pack 62 the takeup pack.

The amount of lift-off is determined by the operating tape tension in the path between the capstans 16 and 36 and the spring rate of the elastic member or spring 46 or 26.

If the direction of rotation of the capstan drive 53 is reversed so that the role of takeup capstan is transferred from the capstan 36 to the capstan 16, then the expanded spring 46 indicated in dotted outline in FIG. 3 will come into operation to maintain tape tension until the arm 43 has become seated against the corresponding stop 48. The arm 23 of the now tape takeup capstan 16 will be angularly moved relative to the pulley 18 and thus lifted off its corresponding stop 28, thereby expanding the spring 26 in the manner shown in dotted outline for the spring 46, except in an opposite sense or direction. That expanded spring is then available to avoid the above mentioned momentary loss of tape tension when the role of tapeup capstan is retransferred from the capstan 16 to the capstan 36.

The expanded spring 26 or 46, as the case may be, will also maintain tension in the tape span when the tape pack assembly or cartridge is removed from the transport, whereby tape slack is automatically taken up. The springs 26 and 46 will also avoid excessive tape tension upon insertion of the tape pack assembly or cartridge into the transport.

In practice, the springs 26 and 46 may also serve to modify the resonant frequency of the tape drive system. For instance, the resonant frequency will be reduced by a factor corresponding to the square root of the spring constant as the arm 23 or 43 is lifted off its corresponding stop 28 or 48.

In accordance with a further preferred embodiment of the subject invention, modification of the resonant frequency of the tape drive system may be restricted or avoided, as desired, by stopping the above mentioned relative movement of the first capstan 16 in a sense of rotation opposite to the above mentioned first sense of rotation 27, and by stopping the above mentioned relative movement of the second capstan 36 in a sense of rotation opposite to the above mentioned second sense of rotation 47.

According to FIG. 3, an additional stop or pin 29, shown in dotted outline, is mounted on the pulley 18 at a distance from the pin 28. Similarly, an additional stop or pin 49, also shown in dotted outline, is mounted on the pulley 38 at a distance from the pin 48. This provides positive limits to the travels of arms 23 and 43 and thus to the amounts of angular movement of the capstans 16 and 36 relative to the capstan drive means 15 and 35 or pulleys 18 and 38, respectively.

In particular, the mutually spaced stops or pins 28 and 29 on the pulley 18 positively limit relative angular movement of the arm 23 and capstan 16 in two angular directions or senses of rotation, with the spring 26 biasing the arm 23 against the stop or pin 28 and elastically restraining relative angular movement of the capstan 16 in an angular direction toward the stop or pin 29.

Similarly, the mutually spaced stops or pins 48 and 49 on the pulley 38 positively limit relative angular movement of the arm 43 and capstan 36 in two angular directions or senses of rotation, with the spring 46 biasing the arm 43 against the stop or pin 48 and elastically restraining relative angular movement of the capstan in an angular direction toward the stop or pin 49.

In addition to the springs 26 and 46, the shear springs rates of the capstan tires 58 and 59 will aid in maintaining tape tension independent of tape speed.

As an important advantage, employment of the elastic couplings 22 and 42 preserves the regenerative nature of the system in that the energy supplied by the tape portion being pulled from the supply pack drives the supply capstan, which then transfers the energy, via the illustrated belting, to the takeup capstan, to supply most of the energy required to wind the tape on the takeup pack. The only input power required thus is the amount needed to overcome the system losses due to friction and, momentarily, to expand one of the springs 26 and 46. Also, use of the elastic couplings 22 and 42 preserves an important function of the capstans 16 and 36, namely the function of squeezing out the boundary layer of air which is normally carried along the tape in moving from the supply to the takeup packs. This permits high-speed operation of the reeling system without loss of tape control and leads to tightly coiled tape packs.

While helical springs have been shown at 26 and 46 it is, of course, clear that spiral or clock springs may be used instead between each pulley 18 or 38 and its corresponding capstan shaft 21 or 41. In either case, the stop 28 or 48 will rigidly restrain relative movement of the capstan 16 or 36 in one sense of rotation, and the spring 26 or 46 or its equivalent will elastically restrain angular movement of the capstan relative to its corresponding pulley 18 or 38 in the opposite sense of rotation.

The subject extensive disclosure will suggest or render apparent various modifications and variations within the spirit and scope of the subject invention to those skilled in the art.

We claim:

1. In a bidirectional tape drive, the improvement comprising in combination:

first tape drive means including a first tape drive capstan, first capstan drive means for rotating said first capstan, means for mounting said first capstan for angular movement relative to said first capstan drive means, first elastic coupling means connected to said first capstan and to said first capstan drive means for elastically restraining relative angular movement between said first capstan and said first capstan drive means, and means connected to at least one of said first capstan and first capstan drive means for stopping angular movement of said first capstan relative to said first capstan drive means in a first sense of rotation;

said first elastic coupling means include first resilient means connected to said first capstan and first capstan drive means for biasing angular movement of said first capstan toward said stopping means; and second tape drive means including a second tape drive capstan, second capstan drive means for rotating said second capstan, means for mounting said second capstan for angular movement relative to said second capstan drive means, second elastic coupling means connected to said second capstan and to said second capstan drive means for elastically restraining relative angular movement between said second capstan and said second capstan drive, and means connected to at least one of said second capstan and second capstan drive means for stopping angular movement of said second capstan relative to said second capstan drive means in a second sense of rotation;

said second elastic coupling means include second resilient means connected to said second capstan and second capstan drive means for biasing angular movement of said second capstan toward said stopping means, and said first and second elastic coupling means acting in opposite angular directions in their restraining functions.

2. In a bidirectional tape drive, the improvement comprising in combination:

first tape drive means including a first tape drive capstan, first capstan drive means including a first pulley for rotating said first capstan, means for mounting said first capstan for angular movement relative to said first capstan drive means including first bearing means on said first pulley for mounting said first capstan for angular movement relative to said first pulley, first elastic coupling means connected to said first capstan and to said first capstan drive means for elastically restraining relative angular movement between said first capstan and said first capstan drive means, and means connected to at least one of said first capstan and first pulley for stopping angular movement of said first capstan relative to said first pulley in a first sense of rotation;

said first elastic coupling means including first resilient means connected to said first capstan and first pulley for biasing angular movement of said first capstan toward said stopping means; and second tape drive means including a second tape drive capstan, second capstan drive means including a second pulley for rotating said second capstan, means for mounting said second capstan for angular movement relative to said second capstan drive means including second bearing means on said second pulley for mounting said second capstan for angular movement relative to said second pulley, second elastic coupling means connected to said second capstan and to said second capstan drive means for elastically restraining relative angular movement between said second capstan and said second capstan drive means, and means connected to at least one of said second capstan and second pulley for stopping angular movement of said second capstan relative to said second pulley in a second sense of rotation;

said second elastic coupling means including second resilient means connected to said second capstan and second pulley for biasing angular movement of said second capstan toward the latter stopping means, and said first and second elastic coupling means acting in opposite angular directions in their restraining functions.

3. A tape drive as claimed in claim 2, wherein:

said first tape drive means include a third pulley and a fourth pulley having a smaller diameter than said third pulley, means connected to said third and fourth pulleys for driving said third and fourth pulleys about a common axis of rotation in a first sense of rotation and selectively in an opposite second sense of rotation, a first elastic belt extending partially about said first and second pulleys and said third pulley to one side of said common axis, and a second elastic belt extending partially about said first and second pulleys and said fourth pulley to a side of said common axis opposite said one side.

4. A tape drive as claimed in claim 1 or 2, wherein:
said first tape drive means include means for stopping said relative angular movement of said first capstan in a sense of rotation opposite to said first sense of rotation; and
said second tape drive means include means for stopping said relative angular movement of said second capstan in a sense of rotation opposite to said second sense of rotation.

5. A tape drive as claimed in claim 1, wherein:
said first tape drive means include a third pulley and a fourth pulley having a smaller diameter than said third pulley, means connected to said third and fourth pulleys for driving said third and fourth pulleys about a common axis of rotation in a first sense of rotation and selectively in an opposite second sense of rotation, a first elastic belt extending partially about said first and second pulleys and said third pulley to one side of said common axis, and a second elastic belt extending partially about said first and second pulleys and said fourth pulley to a side of said common axis opposite said one side.

6. In a method of driving a tape in either of two directions with the aid of a first tape drive capstan, first capstan drive means for rotating said first capstan, a second tape drive capstan, and second capstan drive means for rotating said second capstan, the improvement comprising in combination the steps of:
rendering said first capstan angularly movable relative to said first capstan drive means;
rendering said second capstan angularly movable relative to said second capstan drive means;
elastically restraining angular movement of said first capstan relative to said first capstan drive means in a first angular direction;
stopping angular movement of said first capstan relative to said first capstan drive means in a first sense of rotation;
elastically restraining angular movement of said second capstan relative to said second capstan drive means in a second angular direction opposite to said first angular direction;
stopping angular movement of said second capstan relative to said second capstan drive means in a second sense of rotation;
said elastically restraining of angular movement of said first capstan includes the step of connecting a first resilient member to said first capstan and first capstan drive means for angularly biasing said first capstan relative to said first capstan drive means in said first sense of rotation; and
said elastically restraining of angular movement of said second capstan includes the steps of connecting a second resilient member to said second capstan and second capstan drive means for angularly biasing said second capstan relative to said second capstan drive means in said second sense of rotation.

7. A method as claimed in claim 6, including the steps of:
providing said first capstan drive means with a first pulley;
providing said second capstan drive means with a second pulley; and
rotating said first and second pulleys, with said first pulley being rotated in a first sense of rotation at a higher speed than said second pulley for a drive of said tape in a first direction, and said second pulley being rotated in a second sense of rotation at a higher speed than said first pulley for a drive of said tape in an opposite second direction.

8. A method as claimed in claim 7, wherein:
said first capstan is rendered angularly movable by rendering said first capstan angularly movable relative to said first pulley;
said second capstan is rendered angularly movable by rendering said second capstan angularly movable relative to said second pulley;
angular movement of said first capstan is elastically restrained by said first resilient member relative to said first pulley; and
angular movement of said second capstan is elastically restrained by said second resilient member relative to said second pulley.

9. In a method of driving a tape in either of two directions with the aid of a first tape drive capstan, first capstan drive means for rotating said first capstan, a second tape drive capstan, and second capstan drive means for rotating said second capstan, the improvement comprising in combination the steps of:
rendering said first capstan angularly movable relative to said first capstan drive means;
rendering said second capstan angularly movable relative to said second capstan drive means;
elastically restraining angular movement of said first capstan relative to said first capstan drive means in a first angular direction;
stopping angular movement of said first capstan relative to said first capstan drive means in a first sense of rotation;
elastically restraining angular movement of said second capstan relative to said second capstan drive means in a second angular direction opposite to said first angular direction;
stopping angular movement of said second capstan relative to said second capstan drive means in a second sense of rotation;
stopping said relative angular movement of said first capstan in a sense of rotation opposite to said first sense of rotation; and
stopping said relative angular movement of said second capstan in a sense of rotation opposite to said second sense of rotation;
said elastically restraining of angular movement of said first capstan includes the step of connecting a first resilient member to said first capstan and first capstan drive means for angularly biasing said first capstan relative to said first capstan drive means in said first sense of rotation; and
said elastically restraining of angular movement of said second capstan includes the step of connecting a second resilient member to said second capstan and second capstan drive means for angularly biasing said second capstan relative to said second capstan drive means in said second sense of rotation.

10. In a bidirectional tape drive, the improvement comprising in combination:

first tape drive means including a first tape drive capstan, first capstan drive means for rotating said first capstan, means for mounting said first capstan for angular movement relative to said first capstan drive means, means for biasing angular movement of said first capstan in a first sense of rotation including a first resilient member having an end connected to said first capstan and having another end connected to said first capstan drive means, and means connected to at least one of said first capstan and first capstan drive means for stopping angular movement of said first capstan relative to said first capstan drive means in a first sense of rotation, with said first resilient member biasing angular movement of said first capstan toward said stopping means; and second tape drive means including a second tape drive capstan, second capstan drive means for rotating said second capstan, means for mounting said second capstan for angular movement relative to said second capstan drive means, means for biasing angular movement of said second capstan in a second sense of rotation including a second resilient member having an end connected to said second capstan and having another end connected to said second capstan drive means, said first and second resilient members acting in opposite angular directions in their biasing functions, and means connected to at least one of said second capstan and second capstan drive means for stopping angular movement of said second capstan relative to said second capstan drive means in a second sense of rotation, with said second resilient member biasing angular movement of said second capstan toward the latter stopping means.

11. In a method of driving a tape in either of two directions with the aid of a first tape drive capstan, first capstan drive means for rotating said first capstan, a second tape drive capstan, and second capstan drive means for rotating said second capstan, the improvement comprising the steps of:

rendering said first capstan angularly movable relative to said first capstan drive means;

rendering said second capstan angularly movable relative to said second capstan drive means;

providing a first resilient member, connecting an end of said first resilient member to said first capstan, connecting another end of said first resilient member to said first capstan drive means, and biasing angular movement of said first capstan in a first sense of rotation with said first resilient member;

stopping angular movement of said first capstan relative to said first capstan drive means in a first sense of rotation;

providing a second resilient member, connecting an end of said second resilient member to said second capstan, connecting another end of said second resilient member to said second capstan drive means, and biasing angular movement of said second capstan in a second sense of rotation with said second resilient member; and stopping angular movement of said second capstan relative to said second capstan drive means in a second sense of rotation.

12. In a method of driving a tape in either of two directions with the aid of a first tape drive capstan, first capstan drive means for rotating said first capstan, a second tape drive capstan, and second capstan drive means for rotating said second capstan, the improvement comprising the steps of:

rendering said first capstan angular movables relative to said first capstan drive means;

rendering said second capstan angularly movable relative to said second capstan drive means;

providing a first resilient member, connecting an end of said first resilient member to said first capstan, connecting another end of said first resilient member to said first capstan drive means, and biasing angular movement of said first capstan in a first sense of rotation with said first resilient member;

stopping angular movement of said first capstan relative to said first capstan drive means in a first sense of rotation;

providing a second resilient member, connecting an end of said second resilient member to said second capstan, connecting another end of said second resilient member to said second capstan drive means, and biasing angular movement of said second capstan in a second sense of rotation with said second resilient member;

stopping angular movement of said second capstan relative to said second capstan drive means in a second sense of rotation;

stopping said relative angular movement of said first capstan in a sense of rotation opposite to said first sense of rotation; and stopping said relative angular movement of said second capstan in a sense of rotation opposite to said second sense of rotation.

* * * * *